United States Patent [19]
Smith

[11] Patent Number: 5,836,644
[45] Date of Patent: Nov. 17, 1998

[54] OPENING ROOF FOR A VEHICLE

[75] Inventor: Robert Smith, Wolverhampton, United Kingdom

[73] Assignee: Inalfa Industries B.V., Netherlands

[21] Appl. No.: 735,918

[22] Filed: Oct. 24, 1996

[30] Foreign Application Priority Data

Oct. 25, 1995 [NL] Netherlands .............................. 1001499
Mar. 22, 1996 [NL] Netherlands .............................. 1002685

[51] Int. Cl.$^6$ ...................................................... B60J 7/06
[52] U.S. Cl. ........................... 296/219; 296/223; 296/224
[58] Field of Search .................................... 296/216, 219, 296/223, 224

[56] References Cited

U.S. PATENT DOCUMENTS

| | | | |
|---|---|---|---|
| 3,759,568 | 9/1973 | Unruh ....................................... | 296/98 |
| 4,830,428 | 5/1989 | Masuda et al. .......................... | 296/219 |
| 5,203,605 | 4/1993 | Grimm et al. ........................... | 296/219 |
| 5,310,241 | 5/1994 | Omoto et al. ............................ | 296/219 |

FOREIGN PATENT DOCUMENTS 0208125   8/1990   Japan ..................................... 296/219

Primary Examiner—Dennis H. Pedder
Attorney, Agent, or Firm—Westman, Champlin & Kelly, P.A.; S. Koehler

[57] ABSTRACT

An opening roof for a vehicle having an opening in the fixed roof comprises a frame to be mounted around the opening, and a flexible cover for selectively closing or disposing the opening. A cover plate is fixed to the front side of the cover and is guided at its lateral ends through glide shoes in guide rails extending along either side of the opening in longitudinal direction of the frame. The opening roof is provided with an electric motor and drive cables coupled to the cover plate in order to slide it for opening and closing the opening roof. A displacement mechanism is arranged between the cover plate and the glide shoes, onto which the drive cables act for tightening the cover plate in a forward and downward direction relative to the glide shoes during the final closing movement.

12 Claims, 7 Drawing Sheets

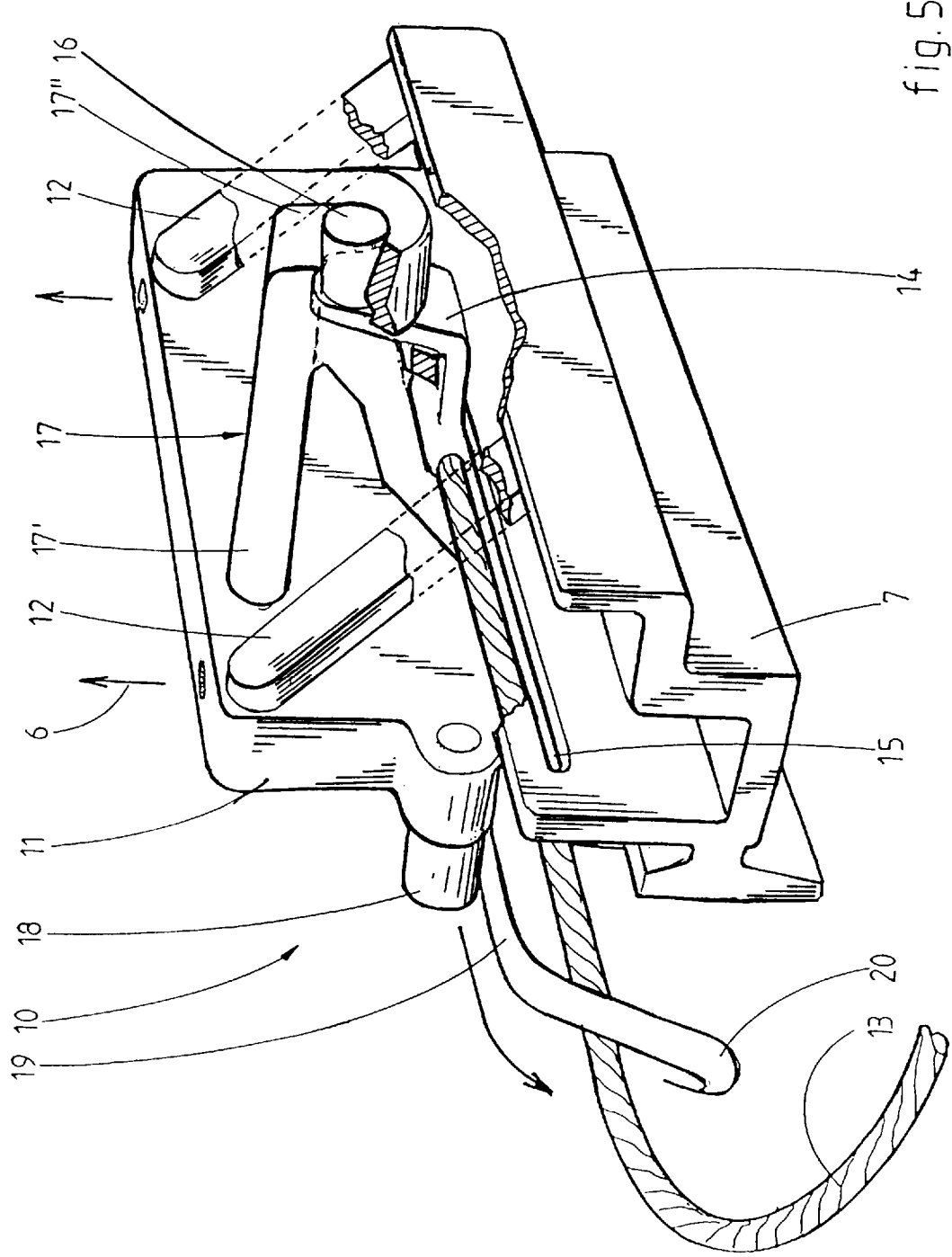

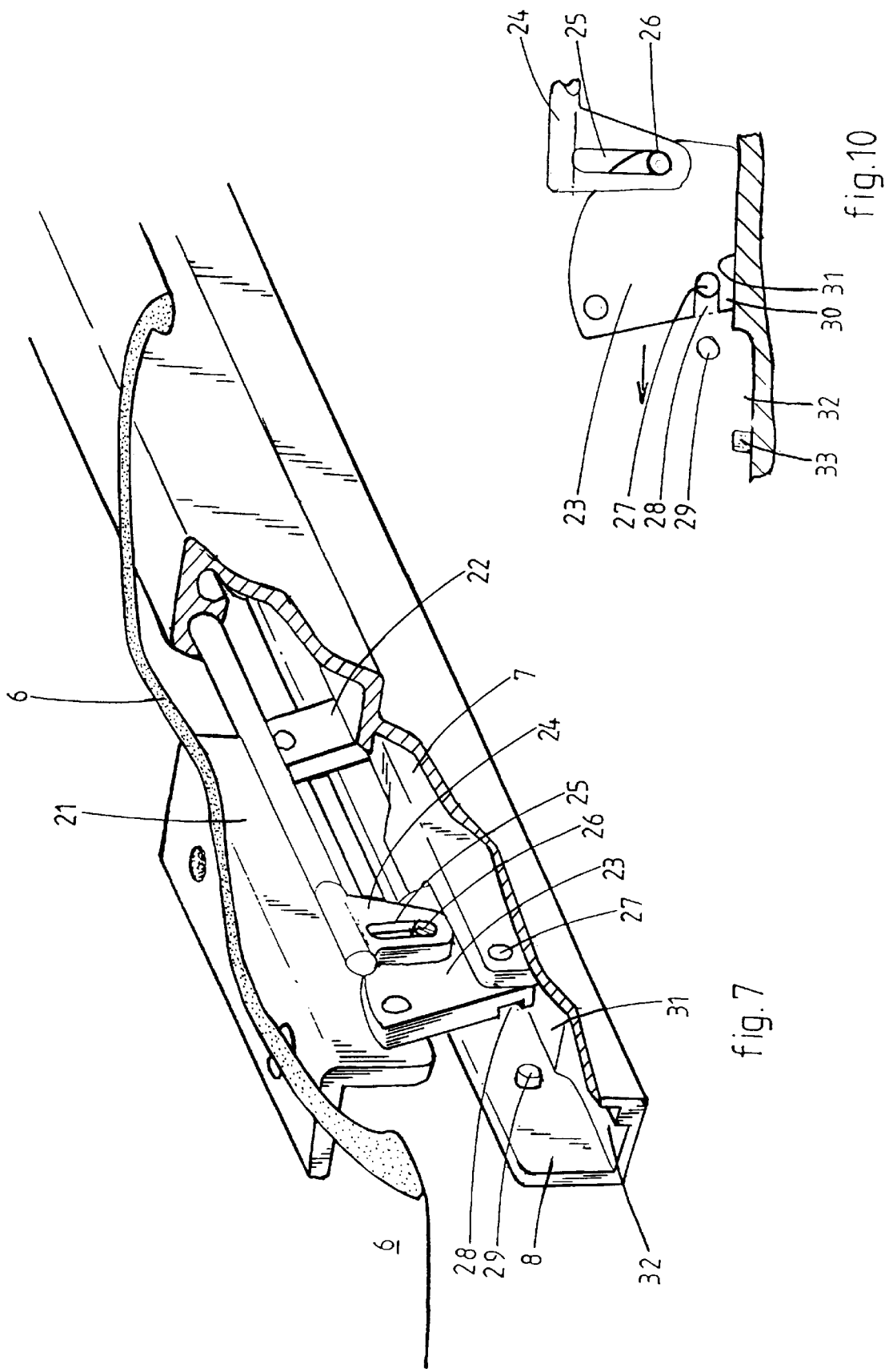

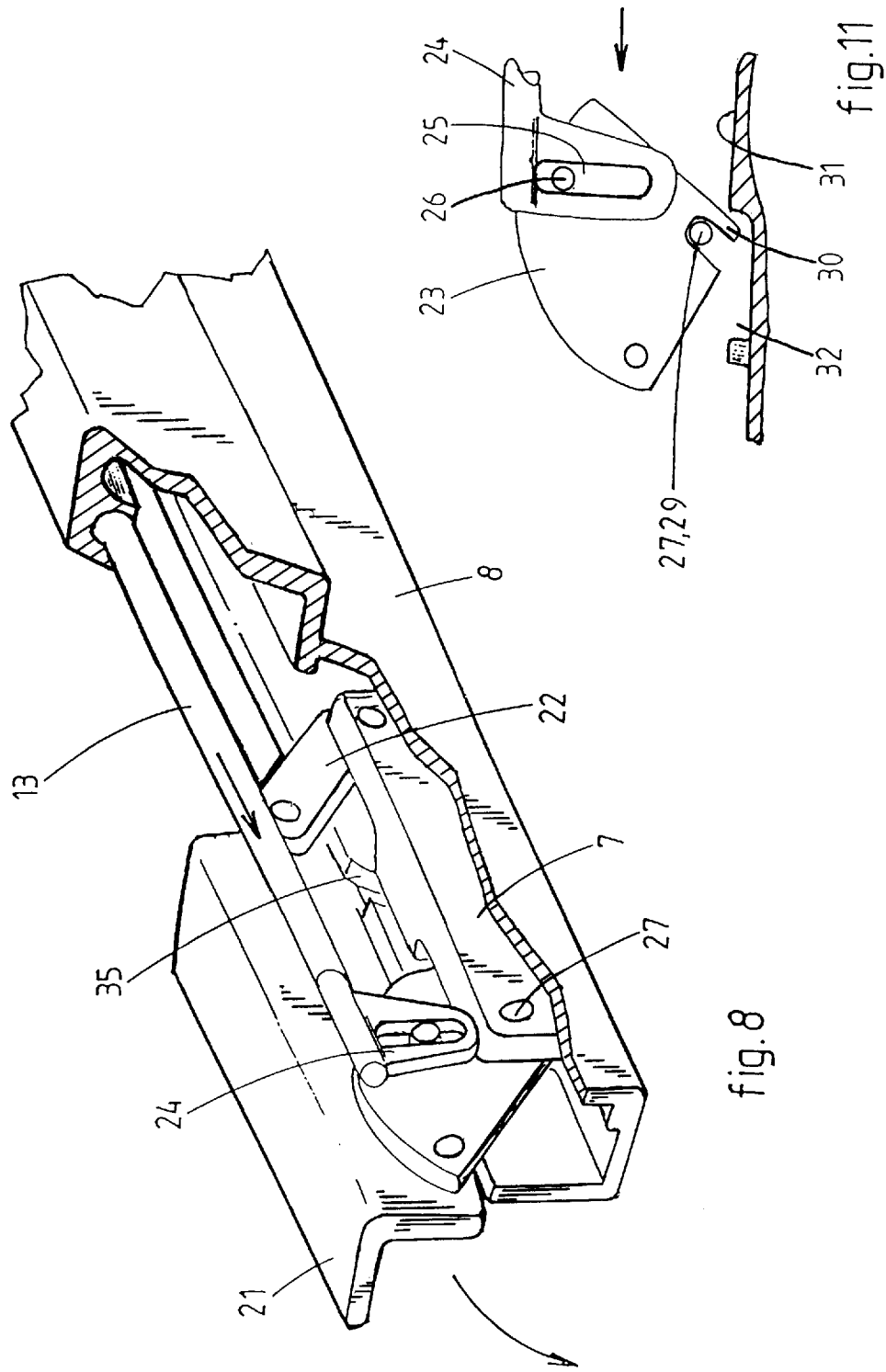

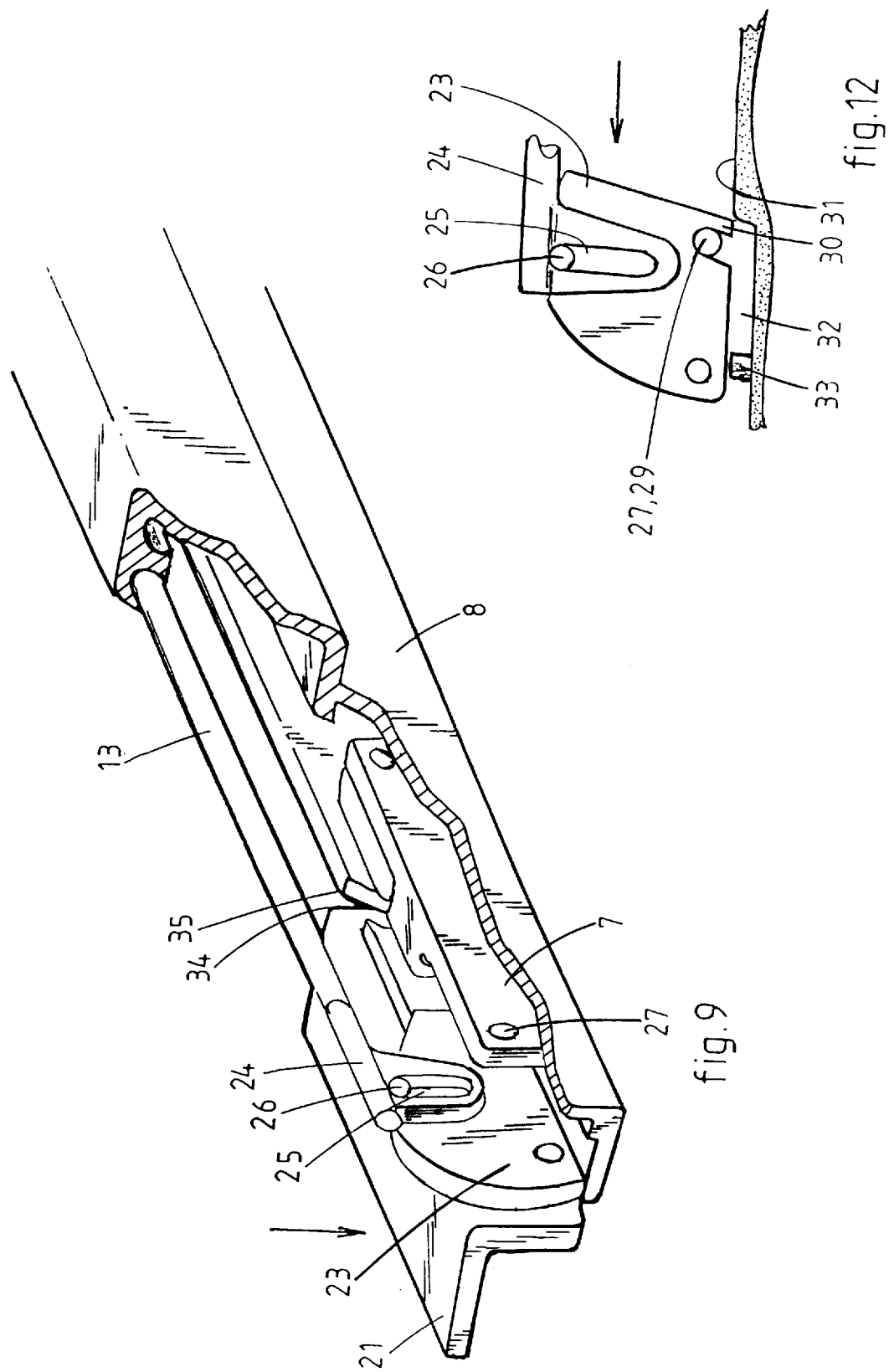

OPENING ROOF FOR A VEHICLE

BACKGROUND OF THE INVENTION

1. Field of the Invention

The present invention relates to an opening roof for a vehicle having an opening in the fixed roof, comprising a frame to be mounted around the opening, a flexible cover for selectively closing or exposing the opening, a cover plate fixed to the cover and guided at its lateral ends through glide shoes in guide rails extending along either side of the opening in a longitudinal direction of the frame, said cover plate being movable between open and closed positions to open and close the cover of the opening roof, and means for bringing and holding the cover plate in the closed position in which it is loaded horizontally and downwardly.

2. Description of the Related Art

In opening roofs, which are opened on the front side, it is a problem to force the cover plate on the front side of the cover forwardly and downwardly. In particular a relatively large force is required to close and lock the cover plate forwardly to tension the cover and to pull the cover plate downwardly in order to obtain a proper seal on the front side of the opening roof. In the present opening roofs, both movements should be carried out by hand and for this purpose two separate operating means should be operated with a relatively large force.

SUMMARY OF THE INVENTION

The object of the invention is to provide an opening roof of the type mentioned in the preamble which may be operated in a much more comfortable way.

For this purpose, the opening roof according to the invention includes drive means coupled to the cover plate in order to slide it for opening and closing the opening roof, and a displacement mechanism between the cover plate and the glide shoes working as said means and onto which the drive means act for tightening the cover plate horizontally and downwardly relative to the glide shoes during the final closing movement.

The drive means, which for example may include an electric motor or a crank, takes over the horizontal and downward closing movement of the cover plate formerly done separately by hand. The displacement mechanism ensures that both movements may be accomplished through a single drive. With an appropriate design of the displacement mechanism, the proper ratio between the horizontal and downward movement can be obtained, while the displacement mechanism can also cause a force enhancement.

In order to activate and de-active the displacement mechanism in a proper manner, the opening roof according to the invention preferably includes first locking means for locking the glide shoes and the displacement mechanism relative to each other in all positions of the glide shoes except for an extreme position, and second locking means for locking the glide shoes in the extreme position.

According to the invention it is preferred that the displacement mechanism is equipped with a four-bar mechanism formed as a deformable parallelogram, such that the cover plate remains in a parallel position during the movement of the displacement mechanism. This mechanism prevents the cover plate from tilting under the influence of the tension in the cover. Tilting of the cover plate may lead to undesired air flows below the cover plate when the vehicle is driving. The four-bar mechanism reduces friction.

As a result of the selection of the length of the bars and the selection of the starting and end position of connecting bars, the desired movement and the ratio between the horizontal and vertical displacement can be chosen. The displacement mechanism is advantageously constructed such that the final portion of the closing movement of the cover plate is as vertical as possible. As a result with a disposed on a lower side of the cover plate shear stresses due to sliding movement of the seal over a stationary sealing surface are provided.

The invention will now be further explained with reference to the drawing showing embodiments of the opening roof according to the invention.

BRIEF DESCRIPTION OF THE DRAWINGS

FIGS. 5 and 6 show in a perspective views two sides the displacement mechanism of the opening roof.

FIGS. 7, 8 and 9 are perspective views of a variant of the displacement mechanism of the first embodiment, in three different positions, FIGS. 10, 11 and 12 are sideviews of a portion of the displacement mechanism of FIG. 7–9 in the same three positions.

DESCRIPTION OF THE PREFERRED EMBODIMENTS

Figure 1:
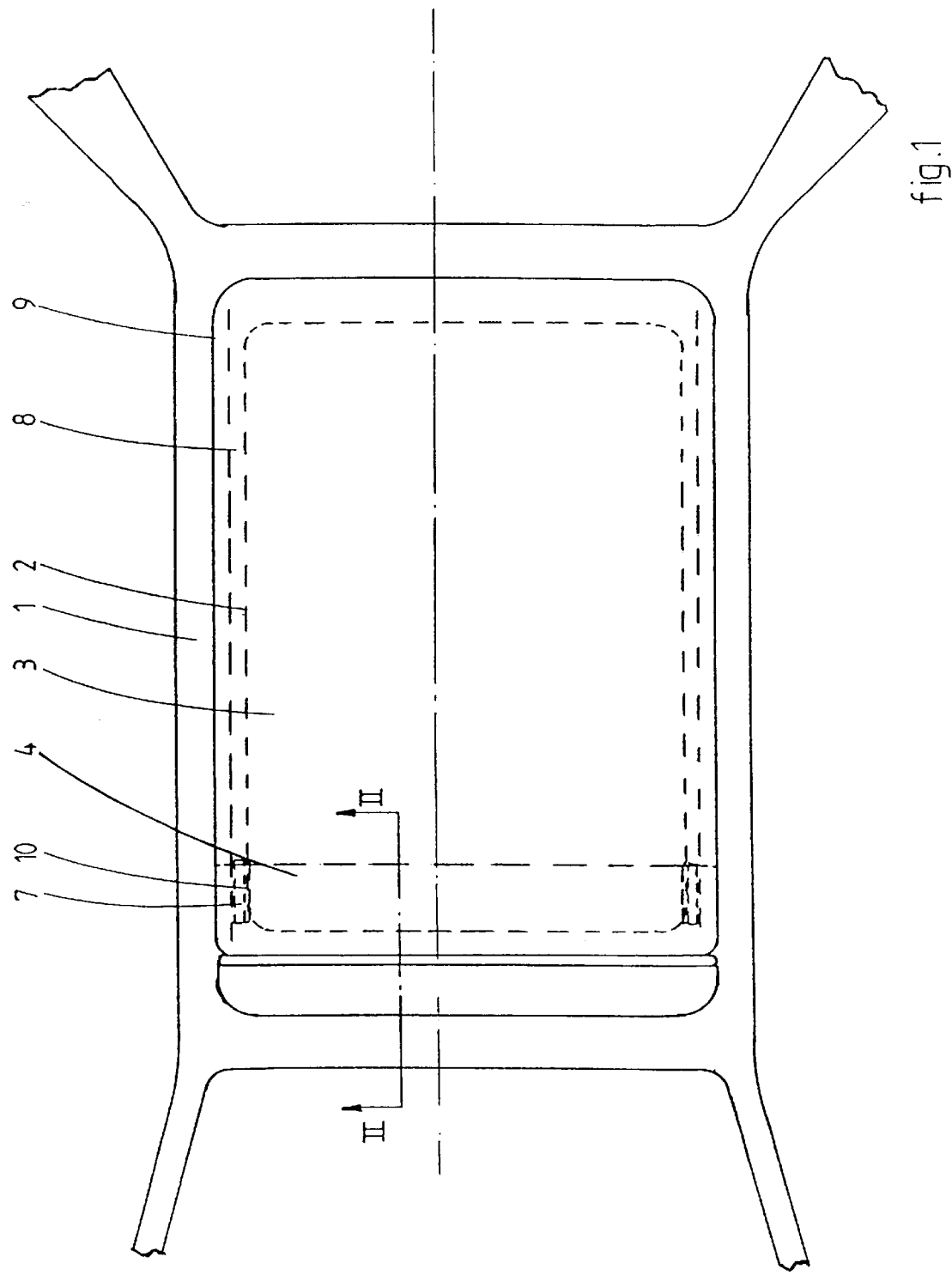
FIG. 1 is a very schematic plan view of a vehicle roof containing an opening roof according to the invention.
Figure 2:
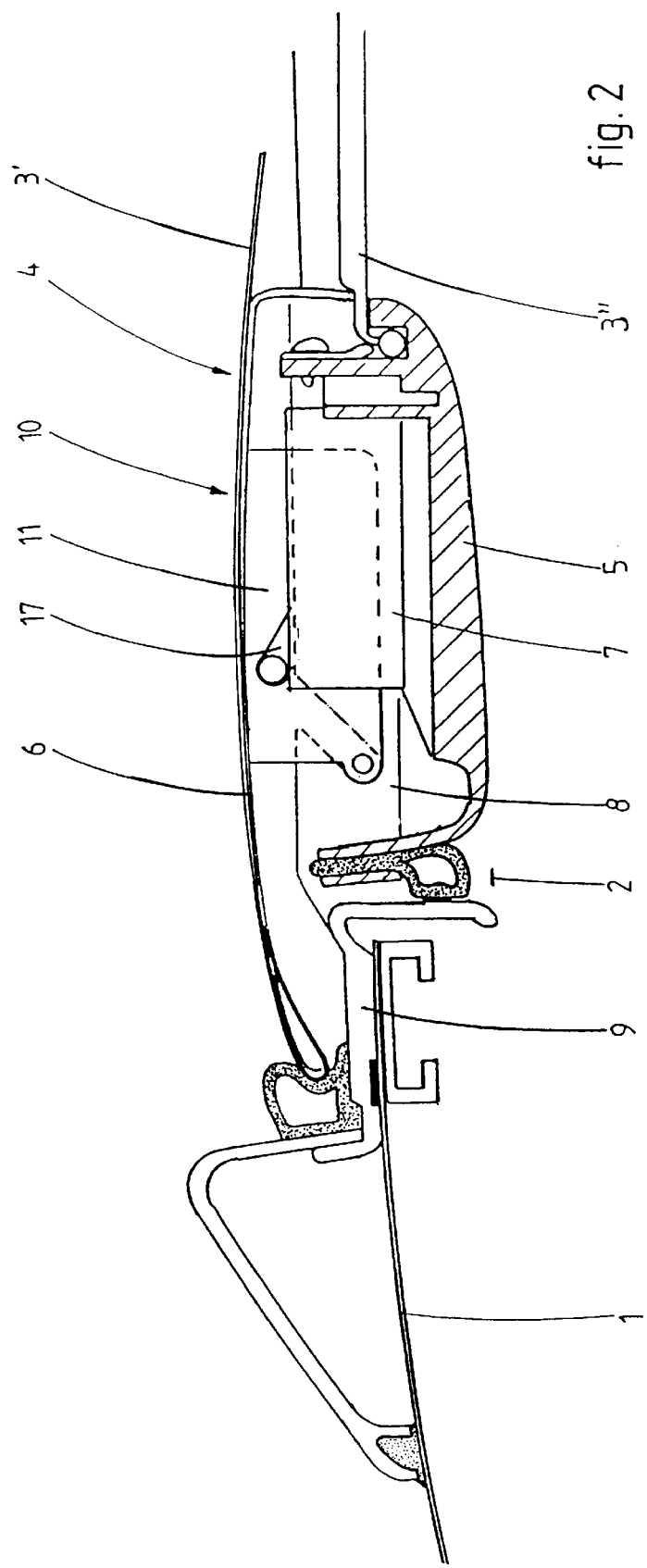
FIG. 2 is an enlarged sectional view along the line II—II of FIG. 1, showing the opening roof in a closed position.

The drawing and first of all FIG. 1 thereof shows a fixed roof 1 of a vehicle, which is provided with an opening 2 therein for receiving the opening roof according to the invention. Referring also to FIG.2, the opening roof comprises a flexible cover 3, consisting of an outer cover 3' and an inner cover 3", on the front side of which there is arranged a front carrier 4. In this examplary embodiment, the front carrier 4 consists of a transverse control beam 5 to which the inner cover 3" is attached and a cover plate 6 connected to the control beam 5 and having the outer cover 3' fixed thereto. By sliding the front carrier 4 forwardly or backwardly, the cover 3 can be folded up to expose the roof opening 2 or can be unfolded again to close the roof opening 2. This manner of folding and guiding the cover 3 does not form part of the present invention and for a possible embodiment thereof reference is made to European patent application 0 606 730, the contents of which are incorporated herein by reference thereto. The present invention only relates to the manner of tensioning and sealing the cover 3 by means of the cover plate 6.

Figure 6:
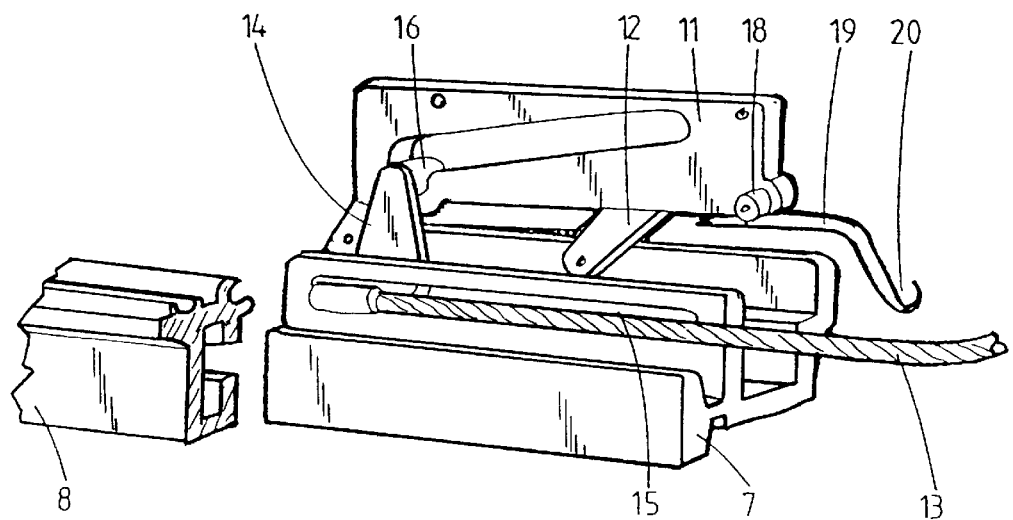

Referring to FIG. 6, the control beam 5 has on both of its lateral ends glide shoes 7 which are guided in guide rails 8 extending on the longitudinal sides of the roof opening 2 in a longitudinal direction of the vehicle. The guide rails 8 can be mounted to or form part of a stationary frame 9 which is attached to the lower or upper side of the vehicle roof 1. It is conceivable, however, to omit the control beam 5 and to use only the glide shoes 7 and the cover plate 6 as the front carrier 4, and in this case the inner cover 3" should then be attached to the cover plate 6 in another way.

FIG. 2 shows that the cover plate 6 is supported by a displacement mechanism 10, the structure and operation of which are more clearly illustrated in FIGS. 3–6. For the sake of completeness it is noted that the drawing shows the displacement mechanism 10 on one longitudinal side of the opening roof only, but in general the other side will include the same displacement mechanism 10 in a mirror image.

FIGS. 3–6 show that the first examplary embodiment of the displacement mechanism 10 comprises a slot plate 11 attached to the lower side of the cover plate 6. The slot plate 11 is connected to the respective glide shoe 7 by means of two inclined bars 12 such that the slot plate 11 together with the glide shoe 7 and the bars 12 form a four-bar mechanism in the shape of a deformable parallelogram. The glide shoe 7 and the slot plate 11 are engaged by drive means embodied as a pull and push cable 13 moveable back and forth in the guide rail 8 by means of an electric motor or manual crank and having on the one hand a carrier 14 attached thereto. The carrier 14 engages the glide shoe 7 through a horizontal slot 15 the glide shoe 7 and has a horizontal transverse pin 16 engaging in a guide slot 17 of the slot plate 11. The guide slot 17 has a forwardly and upwardly inclining front control portion 17' and a short vertical rear locking portion 17".

The slot plate 11 has on its front end a locking member 18 constructed as a roller resting on a horizontal flange 19 of the guide rail 8 in backwardly displaced positions of the glide shoe 7 thereby preventing the slot plate 11 from moving downwardly. The flange 19 terminates on its front end in a downward recess 20 in which the locking member 18 fits.

The operation of the displacement mechanism 10 shown in FIGS. 3–6 is as follows.

In the open positions of the opening roof, in which the glide shoes 7 are displaced rearwardly, the slot plate 11 and the glide shoe 7 form a fixed unit. This is a result of the fact that the transverse pin 16 of the carrier 14 is retained in the vertical locking portion 17" of the guide slot 17 of the slot plate 11 and consequently the slot plate 11 and with it the cover plate 6 and the glide shoe 7 are taken along by the pull and push cable 13 and carrier 14 when these are displaced horizontally. The slot plate 11 is prevented from moving relative to the glide shoe 7 because the transverse pin 16 of the carrier 14 prevents an upward movement of the slot plate 11 and the support of the locking member 18 of the slot plate 11 by the flange 19 prevents a downward displacement thereof. Due to the connection between the slot plate 11 and the glide shoe 7 through the parallel bars 12, the slot plate 11 would only be able to move in a parallel position within a path of movement determined by the four-bar mechanism formed by the bars 12, the slot plate 11 and the glide shoe 7. By retaining any portion of the slot plate 11 in a vertical direction, a movement thereof relative to the glide shoe 7 is prevented so that the glide shoe 7 and the slot plate 11 are permitted to move as a unit only.

Figure 3:
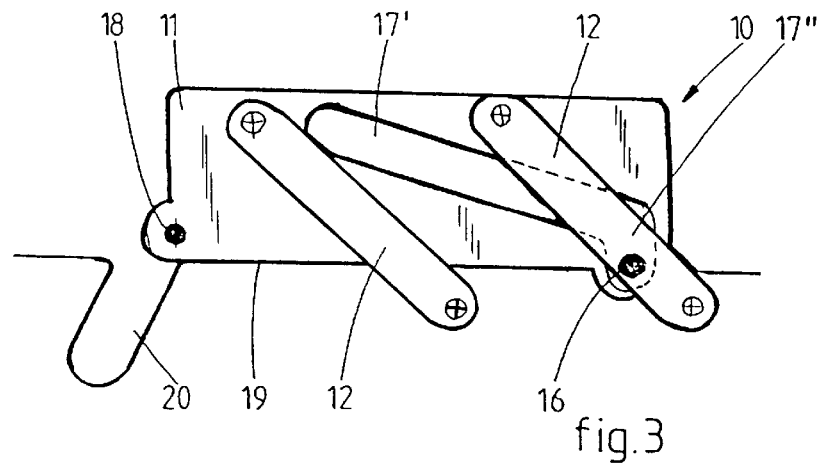
FIGS. 3 and 4 show the operating principle of the displacement mechanism visible in FIG. 2, FIG. 3 and 4 illustrating the two end positions of the displacement mechanism.

FIG. 3 shows the position of the slot plate 11 when the glide shoe 7 has reached the front position, and as a result, the opening roof is almost closed. In order to properly close the opening roof completely, the cover 3 thereof should be properly pulled taut, while the cover plate 6 should also urge the flexible cover 3 against the fixed roof 1 or the stationary frame 9 in order to obtain a proper seal. In order to obtain this, the invention proposes to allow the displacement mechanism 10 to carry out a forward and downward movement when the opening roof is closed. For this purpose, the locking member 18 is released in the front position of the glide shoe 7 because it has arrived above a recess 20 on the front end of the flange 19 as a result of which the locking member 18 is permitted to move downwardly. When the pull and push cable 13 exerts a forward pressure on the slot plate 11 through the transverse pin 16, the four-bar mechanism has a tendency to deform and this is now made possible by the downward movement of the locking member 18 into the recess 20.

Figure 4:
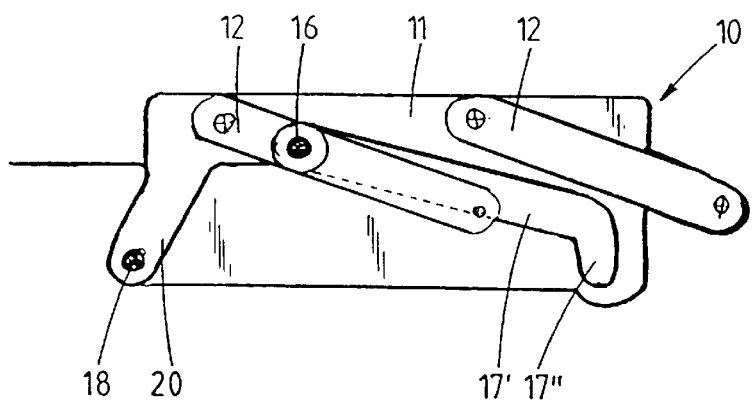

A comparison of FIGS. 3 and 4 shows that the slot plate 11 then starts to make a circular movement guided by the bars 12 during which the slot plate 11 is kept in a horizontal position by the two bars 12. Since the rear side of the slot plate 11 is then moving downwardly, the transverse pin 16 arrives from the locking portion 17" in the front control portion 17' of the guide slot 17, and a further movement of the slot plate 11 will be determined by the displacement of the transverse pin 16 through the guide slot 17. As the control portion 17" of the guide slot 17 has only a slight inclination, it will cause a retarding operation and from then on the position of the bars 12 determine the ratio of the horizontal and vertical displacements of the slot plate 11 and consequently of the cover plate 6. During the movement of the slot plate 11, the inclination of the bars 12 will decrease and as a result the horizontal component of the displacement decreases and the vertical one increases whereby at the end of the closing movement there is hardly any horizontal displacement of the cover plate 6 left and there is hardly any or no sliding movement of its seal on the lower side over a sealing surface, which keeps this seal completely or almost completely free of shear stresses. The retarding action of the guide slot 17 will also cause a force amplification allowing the cover plate 6 to be pushed with substantial greater force forwardly and downwardly than the force on the pull and push cable 13. In one embodiment the force in the horizontal direction, used for pulling the cover 3 taut, is less than the vertical force for urging the seal, for example by a factor of three.

Opening the opening roof from the position of FIG. 4 takes place in the same manner as described, but in reverse.

It is noted that locking the pull and push cable 13 and the carrier 14 relative to the glide shoe 7, in all positions of the glide shoes but the front one, might also be taking place directly instead of or in addition to the locking action through the locking portion 17" of the slot 17 in the slot plate 11. With a direct locking action, it would for example be possible to add a spring loaded pawl which projects into a hollow in the glide shoe 7 when in its locked position. The guide rail 8 could comprise a ramp to forcing the pawl out of the hollow when, upon a forward displacement of the carrier 14, the glide shoe 7 arrives in f the front position. Upon a further forward displacement of the carrier 14, it can move, unlocked from the glide shoe 7, and run with its pin 16 through the slot 17 in the slot plate 11. Upon a reverse movement, the spring load ensures that the pawl is forced into the hollow, after which the carrier 14, the slot plate 11 and the glide shoe 7 may be slid further backwardly as a unit. Such a locking action is also useful in other embodiments.

FIGS. 7–12 show a variation of the displacement mechanism 10 of FIGS. 2–6, in which the slot plate 11 is replaced by a flange plate 21 mounted to the lower side of the cover plate 6 and forming again a four-bar mechanism with the glide shoe 7 through connecting elements. In this case, the connecting elements consist of a normal rear bar 22 and a front rocker element 23 engaged by the pull and push cable 13 through a carrier 24. The carrier 24 is provided with a vertical slot 25 in which a transverse pin 26 formed on the rocker element 23 engages. The rocker element 23 is pivotably connected to the glide shoe 7 through a pivot 27 which is positioned on one side of the rocker element 23. On the side of the rocker element 23 facing away from the pivot 27, there is a recess 28 open on the front side of the rocker element 23 and being positioned horizontally when the opening roof is in the opening position (see FIG. 7 and 10), while the rear portion of the recess 28 is aligned with the pivot 27. To the stationary guide rail 8 on the side of the recess 28 within the rocker element 23, there is formed a rocking and locking cam 29 cooperating with the recess 28 in a manner to be described later on. The lower side of the rocker element 23 has a flat shape and a portion 30 thereof extends forwardly beyond the pivot 27. In the open positions of the opening roof, the rocker element 23 slides with its flat lower side along the bottom 31 of the stationary guide rail 8, serving as flange. At the position of the cam 29, the flange bottom 31 terminates into a depression 32 which is able to receive the portion 30 of the rocker element 23 in order to permit a rocking motion of the rocker element 23.

The operation of the displacement mechanism 10 shown in FIGS. 7–12 is as follows.

In the position shown in FIGS. 7 and 10, the opening roof is in the open position in which the rocker element 23 is prevented from rotating by the abutment of the flat lower side to the flange bottom 31 of the guide rail 8. As a result, when the pull and push cable 13 is displaced horizontally, the carrier 4 takes along the assembly of flange plate 21, bar 22, rocker element 23 and glide shoe 7 as a fixed unit to open or close the opening roof to a greater or smaller extent. In FIGS. 7 and 10, the opening roof approaches the closed position and the recess 28 in the rocker element 23 almost moves around the cam 29 of the guide rail 8.

In FIGS. 8 and 11, the cam 29 has moved into the recess 28 of the rocker element 23 and is abutting to the back wall thereof preventing the rocker element 23 from moving further forwardly at the position of the pivot 27. However, because the portion 30 of the rocker element 23, which projects forwardly beyond the pivot 27, has arrived above the depression 32 in the guide rail 8, a rocking movement of the rocker element 23 is no longer prevented and consequently, upon further forward pressure on the pull and push cable 13, a horizontal force will be exerted on the transverse pin 26 of the rocker element 23 causing the rocker element 23 to rock and allowing the flange plate 21 together with the cover plate 6 to make a forward and downward movement determined by the deformable parallelogram, but maintaining a horizontal position. Because the front portion 30 of the rocker element 23 is received in the depression 23 and the recess 28 rotates from the horizontal position about the cam 29 of the guide rail 8, the rocker element 23 is locked against a horizontal displacement at the position of the pivot 27 and hence also the glide shoe 7, through the pivot 27, is locked in horizontal direction during the operation of the displacement mechanism 10. Due to the rocking movement of the rocker element 23, the transverse pin 26 thereof moves upwardly which is permitted by the vertical slot 25 in the carrier 24 of the pull and push cable 13.

FIGS. 9 and 12 illustrate the final position of the displacement mechanism 10 in which the rocker element 23 has been rocked to its full extent and abuts with a stop 33. In the last part of the movement of the displacement mechanism 10 the displacement of the cover plate 6 is also here almost vertically again due to the horizontal end position of the rocker element 23 and the bar 22. This horizontal position also ensures a proper lock in the closed position which is also assisted by the fact that the transverse pin 26 of the rocker element 23, which is in engagement with the carrier 24, has been moved forwardly beyond the pivot 27. In FIGS. 8 and 9 it is shown that the rear bar 22 can be provided with a transverse projection 34 which comes to lie within a downwardly extending slot 35 in the guide rail 8 when the bar 22 has been pivoted downwardly, thereby providing an additional lock for the glide shoe 7 in the horizontal direction.

From the foregoing it will be clear that the invention provides a control mechanism for an opening roof which offers a great operational comfort, operates in a reliable manner and effects a proper tensioning and sealing action on the cover, despite its simple construction.

The invention is not restricted to the embodiments shown in the drawings and described hereinbefore which may be varied in different manners within the scope of the invention. For example, the displacement mechanism may be constructed in many other ways as long as there is realized a desired horizontal (forward) and downward movement of the cover plate for closing the opening roof. During this movement, the glide shoes do not have to be fully stationary, but may also move in a restricted manner. The invention is not restricted to opening roofs which are opened at the front side. The invention is also useful in opening roofs having a cover plate at both front and rear sides and which can be opened at the front and rear.

I claim:

1. An opening roof for a vehicle having an opening in a fixed roof, the opening roof comprising:

a frame mountable around the opening;

a flexible cover for selectively closing or exposing the opening;

a cover plate fixed to a side of the cover and guided at its lateral ends through glide shoes in guide rails extending along either side of the opening in a longitudinal direction of the frame;

a drive member coupled to the cover plate; and a displacement mechanism between the cover plate and one of the glide shoes and operably connected to the drive member for displacing the cover plate in a forward and downward direction relative to the glide shoes during the final closing movement, the displacement mechanism comprising a four-bar mechanism formed as a deformable parallelogram and having parallel bars pivotally fixed at opposite ends to the glide shoe and the cover plate.

2. The opening roof according to claim 1, comprising first locking means for locking the glide shoes and the displacement mechanism relative to each other in all positions of the glide shoes except for the closed position, and second locking means for locking the glide shoes in the closed position.

3. The opening roof according to claim 2, wherein the first locking means comprise a flange on the guide rails with which a locking member of the displacement mechanism is in engagement in displaced positions of the glide shoes from the closed position to prevent the displacement mechanism from moving in a vertical direction, said flange terminating in a recess, wherein said recess serves as the second locking means.

4. The opening roof according to claim 1, wherein the drive member and the displacement mechanism are engaged through a pin-slot connection for permitting the vertical movement of the displacement mechanism relative to the drive member wherein the drive member includes a moveable element slidable in each guide rail.

5. The opening roof according to claim 2, wherein the deformable parallelogram, retains the cover plate to remain in a parallel position relative to the guide rails during the movement of the displacement mechanism.

6. The opening roof according to claim 1, wherein the displacement mechanism is constructed such that a final portion of the final closing movement of the cover plate is substantially vertical.

7. The opening roof according to claim 5, wherein the cover plate includes a slotted plate portion with a vertically inclined guide slot, and the drive member includes a transverse pin engaging the vertically inclined guide slot.

8. The opening roof according to claim 7, wherein the slotted plate portion is provided with a transverse pin formed thereon, which serves as a locking member and cooperates with a flange and recess of the guide rails to form the first and second locking means, the vertically inclined guide slot being provided on an end with a substantially vertical locking portion in which the transverse pin is positioned for sliding displacement of the glide shoes relative to the guide rails.

9. The opening roof according to claim 5, wherein the displacement mechanism includes a rocker element forming a bar of the four-bar mechanism and wherein the drive member is joined to the rocker element through a pin-slot connection.

10. The opening roof according to claim 9, wherein the rocker element and the glide shoe are connected through a pivot and the rocker element projects forwardly beyond the pivot with a portion which engages the bottom of the guide rail serving as a flange of the first locking means for locking the rocker element, and wherein the flange includes a depression for receiving said portion of the rocker element in order to permit a rocking movement thereof, the guide rail also having a pivot cam formed thereon and the rocker element having a lateral recess formed therein such that the recess is allowed to engage around the pivot cam with the pivot cam and the pivot in line with each other, said pivot cam then also serving as the second locking means.

11. An opening roof for a vehicle having an opening in a fixed roof, the opening roof comprising:

a frame mountable around the opening;

a flexible cover for selectively closing or exposing the opening;

a cover plate fixed to a side of the cover and guided at its lateral ends through glide shoes in guide rails extending along either side of the opening in a longitudinal direction of the frame, the cover plate including a slotted plate portion having a vertically inclined guide slot;

a drive member coupled to the cover plate with a transverse pin engaging the vertically inclined guide slot; and a displacement mechanism between the cover plate and one of the glide shoes for displacing the cover plate in a forward and downward direction relative to the glide shoes during the final closing movement, the displacement mechanism comprising a four-bar mechanism formed as a deformable parallelogram and having parallel bars joining the glide shoe to the cover plate.

12. An opening roof for a vehicle having an opening in a fixed roof, the opening roof comprising:

a frame mountable around the opening;

a flexible cover for selectively closing or exposing the opening;

a cover plate fixed to a side of the cover and guided at its lateral ends through glide shoes in guide rails extending along either side of the opening in a longitudinal direction of the frame;

a drive member; and a displacement mechanism between the cover plate and one of the glide shoes for displacing the cover plate in a forward and downward direction relative to the glide shoes during the final closing movement, the displacement mechanism comprising a four-bar mechanism wherein a rocker element forms a bar of the four-bar mechanism, and wherein the drive member is joined to the rocker element through a pin-slot connection, and wherein the rocker element and the glide shoe are connected through a pivot and the rocker element projects forwardly beyond the pivot with a portion which engages the bottom of the guide rail serving as a flange for inhibiting rotation of the rocker element, and wherein the flange includes a depression for receiving said portion of the rocker element in order to permit a rocking movement thereof, the guide rail also having a pivot cam formed thereon and the rocker element having a lateral recess formed therein such that the recess is allowed to engage around the pivot cam with the pivot cam and the pivot in line with each other, said pivot cam then also serving to limit sliding movement of the rocker element relative to the guide rail.

\* \* \* \* \*

UNITED STATES PATENT AND TRADEMARK OFFICE
CERTIFICATE OF CORRECTION

PATENT NO.   :   5,836,644
DATED        :   November 17, 1998
INVENTOR(S) :    Smith It is certified that error appears in the above-identified patent and that said Letters Patent is hereby corrected as shown below:

Column 6, line 52, before ",", insert --for releasing the displacement mechanism--.

Column 6, line 61, delete ",".

Signed and Sealed this

Sixteenth Day of March, 1999

Attest:

Q. TODD DICKINSON

Attesting Officer

Acting Commissioner of Patents and Trademarks